Sept. 1, 1964 I. M. KLIMAN 3,147,474

INFORMATION TRANSFORMATION SYSTEM

Filed Jan. 23, 1962 2 Sheets-Sheet 1

INVENTOR.

BY IVAN M. KLIMAN

ATTORNEY

Sept. 1, 1964 I. M. KLIMAN 3,147,474

INFORMATION TRANSFORMATION SYSTEM

Filed Jan. 23, 1962 2 Sheets-Sheet 2

INVENTOR.
IVAN M. KLIMAN

BY

ATTORNEY

United States Patent Office 3,147,474
Patented Sept. 1, 1964

3,147,474

INFORMATION TRANSFORMATION SYSTEM

Ivan Merwin Kliman, Glen Head, N.Y., assignor to Sperry Rand Corporation, Great Neck, N.Y., a corporation of Delaware Filed Jan. 23, 1962, Ser. No. 168,089
3 Claims. (Cl. 340—347)

This invention relates to information transformation means and more particularly to the use of a magnetic core matrix for transferring between two information identification systems for designating or identifying the same information and for providing the transformed information in a time sequence which is compatible with the timing and operation of equipment adapted to handle information expressed only in the second of the two systems.

The present invention is useful, for example, in position indicating systems such as radar systems for changing the designation of a target from coordinates in one coordinate system to corresponding coordinates in a different coordinate system.

In applicant's copending application Serial No. 168,090, filed January 23, 1962, a somewhat similar transformation means is disclosed wherein each core of a magnetic core matrix has at least two pairs of lines threaded therethrough, wherein each pair corresponds to individual coordinates of a respective coordinate system. In said copending application, a pair of lines corresponding to the $r-\theta$ coordinates of a polar coordinate system may transfer the magnetization state of a core from its first to its second remanent state, and when the same $r-\theta$ coordinate lines are simultaneously energized in the opposite sense the core switches back to its first remanent magnetization state and the other pair of lines which correspond to individual $x-y$ coordinates of a rectangular coordinate system, for example, then are energized to provide output signals on those $x-y$ lines. As disclosed in said application S.N. 168,090, the $x-y$ lines are sensing lines only, and the order of appearance of output signals thereon is not necessarily timed in the proper sequence for direct utilization in equipment adapted to handle only information expressed in terms of the $x-y$ coordinates.

It sometimes is desirable that the output signals obtained from storage in the magnetic core matrix appear in an ordered time sequence that allows them to be directly utilized, without a transformation in time sequence, in equipment adapted to handle the output information expressed in terms of the second coordinate system.

It therefore is an object of the invention to provide apparatus for transforming the designation of information from a first information identification system to a second information identification system, and in addition to provide the output signals in a time sequence which is compatible with the operation of equipment adapted to handle only information expressed in terms of said second information identification system.

The present invention will be described by referring to the accompanying drawings wherein.

Figure 1:
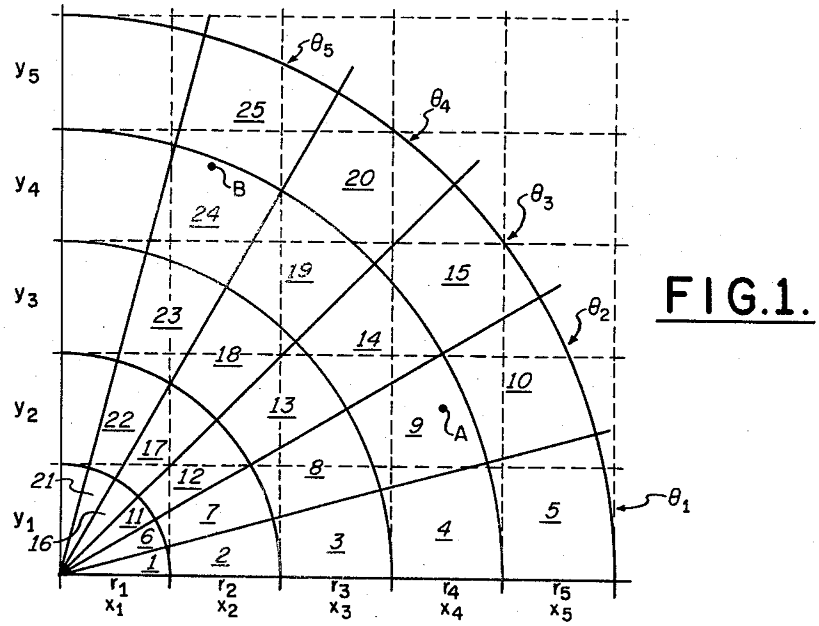
FIG. 1 is a chart showing the correspondence between polar and rectangular coordinates for identifying positions within a given area, and is useful for establishing the relationship between said coordinate system with respect to said area.

The present invention is useful in a scanning radar system of the type illustrated in applicant's copending application Serial No. 168,090. The sector scanned by the radar may be as illustrated in FIG. 1, wherein the entire sector is subdivided into smaller angular sectors $\theta_1-\theta_5$, and each of these smaller sectors is further divided in range by the range segments $r_1-r_5$. A remotely located target within the sector of scan of the radar therefore will fall within one of the polar areas numbered 1–25, each one of which may be identified by $r-\theta$ polar coordinates. The area of scan further is subdivided by a rectangular coordinate system whose individual coordinates are $x_1-x_5$ and $y_1-y_5$. Therefore, any position within the sector of scan of the radar may be identified by coordinates in both the polar and rectangular coordinate systems. The $r-\theta$ coordinates may be considered as respective groups of characters in the first information identification system and the $x-y$ coordinates may be considered as respective groups of characters in the second information identification system.

Figure 2:
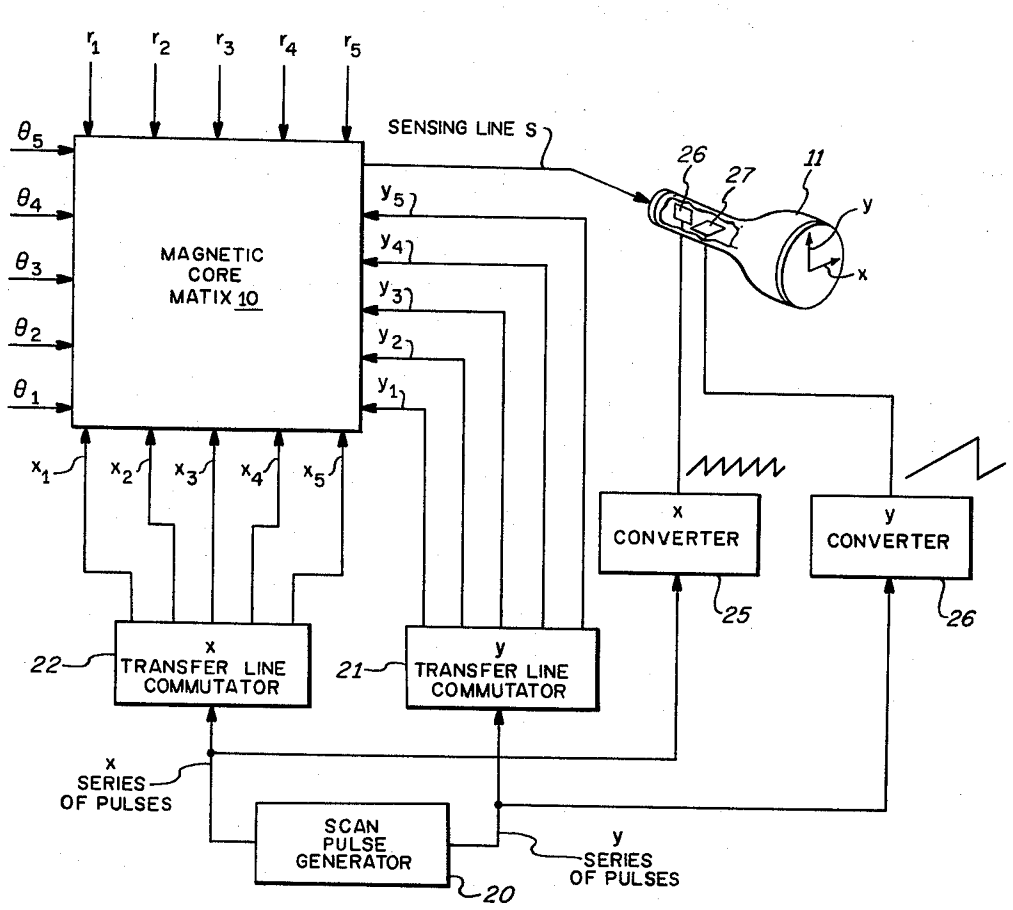
FIG. 2 is a simplified block diagram of a coordinate transformation system adapted to operate in accordance with the present invention.

The radar system employing the present invention may be operated in the manner of the system described in applicant's copending application, wherein the antenna scans in azimuth through the sectors $\theta_1-\theta_5$, and as these sectors are successively scanned the receiver is successively coupled in synchronism with the scanning antenna to corresponding row selector lines $\theta_1-\theta_5$, FIG. 2, which thread respective rows of cores in magnetic core matrix 10. That is, when the antenna is scanning angular sector $\theta_1$ of FIG. 1, the receiver is connected through appropriate switching means to row selector line $\theta_1$, FIG. 2, and when the antenna is scanning angular sector $\theta_2$ of FIG. 1, the receiver is coupled through the appropriate switching means to row selector line $\theta_2$, and so on. During each pulse repetition interval of the radar the column selector lines $r_1-r_5$ are sequentially energized by successively occurring range gates. Column selector lines $r_1-r_5$ thread respective columns of magnetic cores in matrix 10. Said matrix is operated in accordance with the well-known coincident current technique wherein the simultaneous energization of the respective column and row selector lines threading a core cause that core to transfer from one of its remanent magnetization states to the other remanent magnetization state. It will be assumed in this discussion that all cores of matrix 10 initially are in their first remanent magnetization state and the simultaneous energization of the $r-\theta$ selector lines associated with a core will transfer that core to its second remanent magnetization state.

Figure 3:
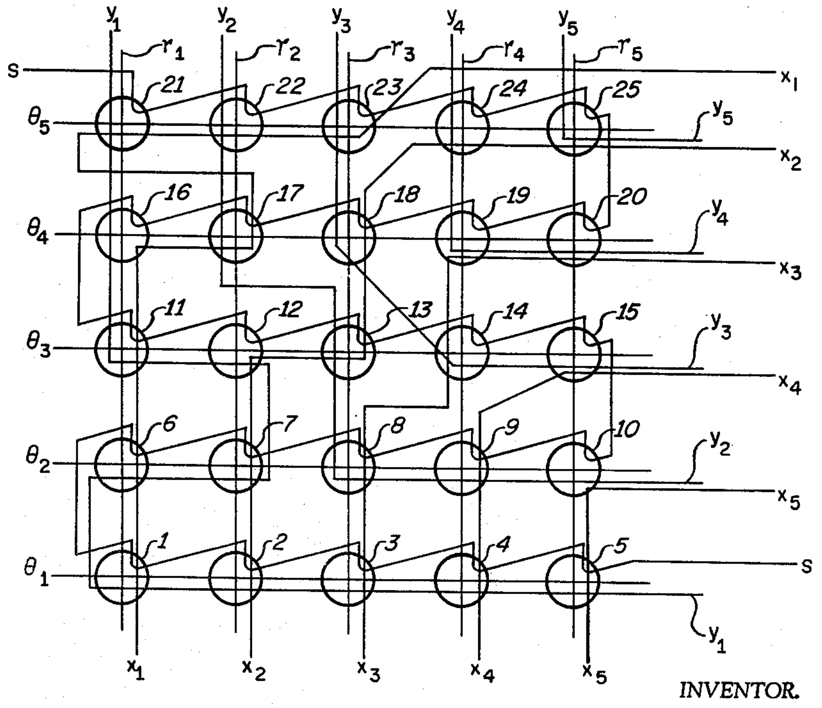
FIG. 3 is a schematic diagram of a magnetic core matrix wired to operate in accordance with the present invention.

A wiring diagram of matrix 10 is illustrated in FIG. 3 wherein each of the cores has a number which corresponds to one of the polar areas 1–25 of FIG. 1. The $r-\theta$ column and row select lines threading a given core in the matrix of FIG. 3 have the same polar coordinate designations as the correspondingly numbered polar area in FIG. 1, so that when a target is detected within one of the polar areas of FIG. 1 the correspondingly numbered core in matrix 10 of FIG. 3 is transferred from its first to its second magnetization state. For example, assume that there are two remotely located objects A and B, FIG. 1, whose positions fall within the polar areas 9 and 24, respectively. The polar and rectangular coordinates of these objects are $r_4$–$\theta_2$, $x_4$–$y_2$ and $r_4$–$\theta_5$, $x_2$–$y_4$. When the antenna of the radar is scanning angular sector $\theta_2$, pulses will be reflected from object A in polar sector 9 and will be returned to the radar and will be detected by the receiver. At this instant of time the receiver is connected to row selector line $\theta_2$. Simultaneously, column selector line $r_4$ is energized by one of the successively occurring range gates and the coincident energization of the $\theta_2$–$r_4$ select lines causes magnetic core 9, FIG. 3, to transfer from its first to its second remanent magnetization state. In a similar manner, magnetic core 24 is transferred from its first to its second remanent magnetization state by the simultaneous energization of its column and row selector lines $r_4$—$\theta_5$ when the returned echo signal is received from object B located in polar sector 24. In this condition, the magnetic core matrix is storing information identifying objects A and B in terms of their polar coordinates.

In order to read out this stored information in terms of the $x$–$y$ coordinates of objects A and B, the correspondance between the polar and rectangular coordinates must be established in the matrix 10 of FIG. 3. The means for accomplishing this may be explained by first referring to FIG. 1 wherein it may be seen that each polar area falls within one of the abscissa coordinate areas $x_1$–$x_5$ and within one of the ordinate coordinate areas $y_1$–$y_5$. For example, within abscissa coordinate area $x_3$ are the polar areas 3, 8, 14, 19 and 20. Similarly, within the $y_2$ ordinate coordinate area are the polar areas 22, 17, 13, 8, 9 and 10. Further examination of the superimposed coordinate systems of FIG. 1 will show that each polar area may be associated with respective coordinate areas identified by $x$–$y$ coordinates.

It may be seen in FIG. 1 that the resolution between the two coordinate systems may be somewhat poor in that one polar area may fall within two or more rectangular coordinate areas. This results from the fact that a small number of coordinates were selected for each coordinate system in order to simplify the drawings and description. In practice, greatly improved resolution is obtainable by further subdividing the scanned area and by adding a greater number of columns and rows to the matrix 10 of FIG. 3.

The correspondence between the two coordinate systems is accomplished in the matrix of FIG. 3 by threading transfer lines having rectangular coordinate designations through the cores having numbers corresponding to the polar areas which fall within the rectangular coordinate area having the same rectangular coordinate designation as the transfer line. For example, rectangular coordinate transfer line $x_3$ threads the cores whose numbers correspond to the polar areas 3, 8, 14, 19 and 20, and the $y_3$ coordinate transfer line threads the cores whose numbers correspond to the polar areas 15, 14, 18 and 23. Tracing the path of the remaining coordinate transfer lines will further establish the correspondence between the two coordinate systems.

Referring now to FIG. 2, it is desired that the information stored in magnetic core matrix 10 be read out and displayed on a cathode ray oscilloscope 11 in a raster-type scan having $x$ and $y$ coordinates. To accomplish this it is necessary that the stored information be read out in terms of its $x$–$y$ coordinates in synchronism with the $x$–$y$ scanning of the electron beam of the cathode ray oscilloscope 11. This is accomplished as follows: The information stored in the magnetic core matrix of FIG. 3 is read out by simultaneously energizing the respective $x$–$y$ transfer lines threading that core. The energization of the $x$–$y$ lines associated with a core is in an opposite sense to the energization provided by the $r$–$\theta$ selector lines so that the core now transfers from its second back to its first remanent magnetization state. A common sensing line S threads each core in said matrix in series fashion so that the retransfer of any core in said matrix from its second back to its first remanent magnetization state will produce an output signal on said common sensing line S.

The means providing the coincident timing of the read out from magnetic core matrix 10 and the display on oscilloscope 11 is illustrated in FIG. 2, wherein scan pulse generator 20 produces two series of output pulses coupled respectively to $y$-transfer line commutator 21 and $x$-transfer line commutator 22. The series of pulses coupled to $x$-commutator 22 has a repetition frequency five times greater than that of the series coupled to $y$-commutator 21. Each of the commutators 21 and 22 may be of a type of circuit known as an elecronic commutator circuit. These circuits have a single input line and a plurality of output lines and operate to sequentially couple each successive input pulse to a different one of its output lines. For example, a series of input pulses coupled to $x$-commutator 22 will successively appear in sequence on its transfer lines $x_1$–$x_5$. These circuits are well known to those skilled in the art and further explanation is believed unnecessary.

Each of the converters 25 and 26 of FIG. 2 is coupled to receive the correspondingly lettered series of pulses from scan pulse generator 20, and each produces an analog output voltage whose amplitude increases proportionally as the count of the respective series of pulses coupled thereto increases. Converters 25 and 26 each operates to reset itself after a count of five pulses has been received, and because the pulse repetition of the $x$ series of pulses is five times the repetition frequency of the $y$ series of pulses, the output voltages of converters 25 and 26 are saw-tooth waveform voltages wherein the duration of the $y$ converter saw-tooth waveform is five times the duration of each saw-tooth waveform of converter 25. These $x$ and $y$ saw-tooth waveform voltages are coupled to the horizontal and vertical deflection plates 26 and 27, respectively, of oscilloscope 11 and provide an $x$–$y$ rectangular coordinate scan of the electron beam on the face of oscilloscope 11.

In the operation of apparatus of FIG. 2 to read out information in terms of $x$–$y$ coordinates, the cores in matrix 10 whose $r$–$\theta$ coordinate designations correspond to the polar coordinates of the detected targets in space will be in their second remanent magnetization states (cores 9 and 24 in the example assumed here). All other cores will be in the first remanent magnetization states. Scan pulse generator 20 produces an output series of pulses at a first pulse repetition frequency to $y$ transfer line commutator 21 and a second series of pulses at a repetition frequency five times the first pulse repetition frequency to $x$ transfer line commutator 22. Y-commutator 21 causes row transfer line $y_1$ to be first energized, and during its time of energization, $x$-transfer line commutator sequentially energizes column transfer lines $x_1$–$x_5$. Because all cores threaded by the $y_1$ line, FIG. 3, are in their first magnetization states, none of them will change states and the sensing line S will not be energized. Next, $y$-transfer line commutator 21 will energize the $y_2$ row transfer line and during its energization the column transfer lines $x_1$–$x_5$ again will be sequentially energized. Because core 9 is in its second remanent magnetization state, the simultaneous energization of the $y_2$–$x_4$ transfer lines will cause the core to transfer back to its first remanent magnetization state which in turn energizes sensing line S to produce a read-out pulse in synchronism with the $y_2$–$x_4$ transfer pulses. This scanning of the $y$–$x$ lines continues in an ordered sequence until all cores have been scanned. Because core 24 also was in its second magnetization state it will transfer to its first remanent magnetization state when rectangular coordinate transfer lines $y_4$–$x_2$ are simultaneously energized. This in turn energizes the sensing line S and produces a read-out pulse in synchronism with the $y_4$–$x_2$ transfer pulses.

Digital-to-analog converters 25 and 26 also receive the respective series of pulses from scan pulse generator 20 and produce respective $x$ and $y$ deflection voltages which are coupled to horizontal and vertical deflection plates 26 and 27 in cathode ray oscilloscope 11. These deflection voltages produce a rectangular coordinate raster-type scan of the electron beam on the face of oscilloscope 11, and because this scanning is in synchronism with the energization of the $x$–$y$ transfer line in matrix 10, the $x$–$y$ read-out pulses on sensing line S will unblank the beam of oscilloscope 11 at the correct times to present indications of targets at their correct $x$–$y$ coordinate positions in the rectangular coordinate display on the face of oscilloscope 11.

The transformation between the two information identification systems may be in the opposite direction if desired. That is, the input information stored in matrix 10 could be in terms of $x$–$y$ coordinates, and the stored information could be read out and presented on oscilloscope 11 in terms of $r$–$\theta$ coordinates. The changes required in the system of FIG. 2 to accomplish this reversal of operation are believed to be obvious.

The use of the present invention in a radar system is for illustrative purposes only and it is to be understood that the present invention may be used in other specific applications, such as, code conversion or the conversion to a second format of information available only in a final format.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for transforming the designation of information from a first information identification system to a second information identification system comprising
   a plurality of magnetic core members having two remanent magnetization states,
   a plurality of sets of selector lines,
      each set corresponding to a group of characters in said first information identification system,
      each core in said matrix having one line from each of said sets of selector lines threaded therethrough,
   a plurality of transfer lines each corresponding to a character in a second information identification system,
      each transfer line threading a respective combination of one or more cores in said matrix,
      said combinations being selected in accordance with the correspondence between said two systems for identifying the same information,
      whereby the selector and transfer lines threading a core corresponding to the characters in the respective information identification systems which represent the same information,
   a common sensing line threading each core in said matrix in a serial fashion,
   means for receiving information expressed in said first information identification system and for energizing the selector lines whose designations correspond to the characters present in said input information, thereby to transfer selected cores in said matrix to their second remanent magnetization states to store input information in terms of said first information identification system, and
   means for energizing said transfer lines in an ordered time sequence to retransfer to their first magnetization states the cores in said matrix then in their second magnetization state, thereby to produce output signals on said sensing line in said given ordered sequence in terms of said second information identification system.

2. Means for transforming the designation of information from a first information identification system to a second information identification system comprising
   a plurality of magnetic core members having two remanent magnetization states,
   a plurality of sets of selector lines,
      each set corresponding to a group of characters in said first information identification system,
      each core of said matrix having one line from each of said sets of selector lines thread therethrough,
   a plurality of transfer lines each corresponding to a character in a second information identification system,
      each transfer line threading a respective combination of one or more cores in said matrix,
      said combinations being selected in accordance with the correspondence between said two systems for identifying the same information,
      whereby the selector and transfer lines threading a core correspond to the characters in the respective information identification systems which represent the same information,
   a common sensing line threading each core in said matrix in a serial fashion,
   means for receiving information expressed in said first information identification system and for energizing the selector lines whose designations correspond to the characters present in said input information, thereby to energize selected cores in said matrix to store said input information therein in terms of the characters of said first information identification system,
   utilization means coupled to said sensing line and adapted to operate only in a time sequence compatible with a given ordered sequence of appearance of output signals on said sensing line,
   and timing means for energizing said transfer lines to retransfer to their first magnetization states the cores in said matrix then in their second magnetization state in a manner to produce output signals on said sensing line in said given ordered sequence,
      said timing means also operating to control the timing of said utilization means to accept and utilize the output signals from said sensing line in terms of the characters of said second information identification system.

3. A space coordinate transformation system comprising
   a matrix of magnetic core members arranged in rows and columns,
      said cores being transferable from one remanent magnetization state to another,
   a set of column selector lines each one threading a respective one of said columns in the matrix,
   a set of row selector lines each one threading a respective one of said rows in the matrix,
      said two sets of selector lines corresponding to two sets of coordinates of a first space coordinate system,
      each of said cores being transferred from its first to its second magnetization state only upon the simultaneous magnetization of its respective column and row selector lines,
   a first set of core transfer lines each one threading a different combination of cores in said matrix,
   a second set of core transfer lines each one threading a different combination of cores in said matrix,
      said two sets of transfer-lines corresponding to two sets of coordinates of a second space coordinate system and the respective combinations of cores threaded by said two sets of transfer lines being determined in accordance with the relationship between said first and second coordinate systems, a sensing line threading each core of said matrix in series relationship and adapted to be energized whenever a core in said matrix transfers from its second to its first remanent magnetization state, a utilization means coupled to said sensing line and adapted to receive output signals from said sensing line, said utilization means being adapted to operate only with information expressed in terms of said second coordinate system when coupled thereto in a given time sequence, and timing apparatus for energizing the respective sets of transfer lines in an ordered sequence and for controlling the operation of said utilization means in said ordered sequence.

References Cited in the file of this patent

UNITED STATES PATENTS

| | | |
|---|---|---|
| 2,807,005 | Weidenhammer | Sept. 17, 1957 |
| 2,902,677 | Counihan | Sept. 1, 1959 |
| 3,037,203 | Woods | May 29, 1962 |